July 20, 1965 D. M. HESLING 3,195,903
PISTON OIL CONTROL RING
Filed Feb. 5, 1962
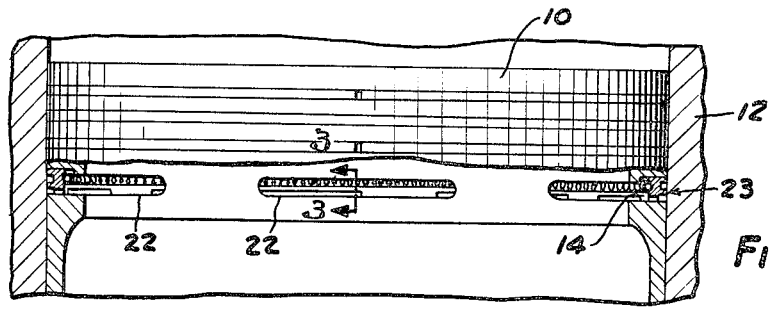
FIG. 1
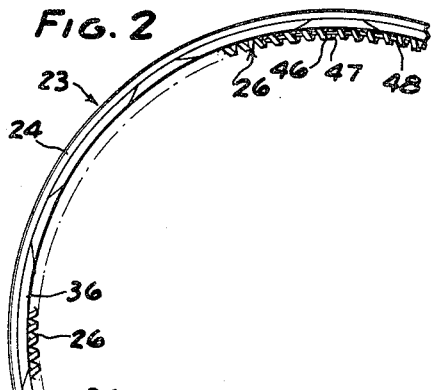
FIG. 2
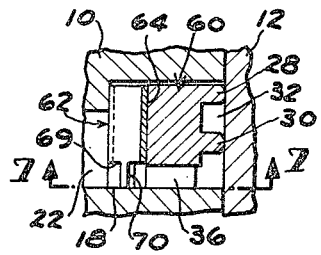
FIG. 6
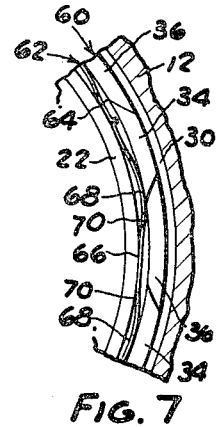
FIG. 7
FIG. 3
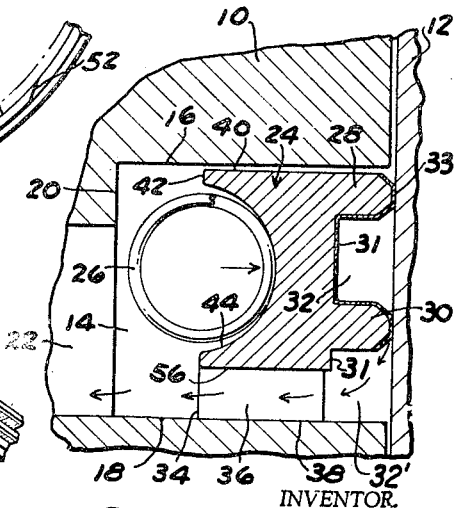
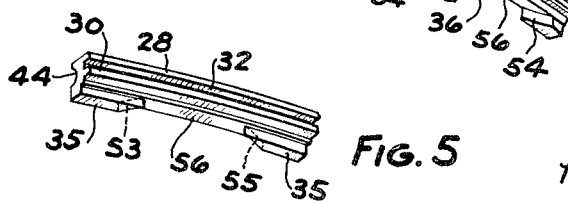
FIG. 4
FIG. 5
INVENTOR.
DONALD M. HESLING
BY
Barnes, Kisselle, Raisch & Choate
ATTORNEYS

United States Patent Office 3,195,903
Patented July 20, 1965

3,195,903
PISTON OIL CONTROL RING
Donald M. Hesling, Muskegon, Mich., assignor to Sealed Power Corporation, Muskegon, Mich., a corporation of Michigan
Filed Feb. 5, 1962, Ser. No. 171,093
1 Claim. (Cl. 277—78)

This invention relates generally to piston rings and in particular to an oil control ring and ring-expander assembly for use in a piston of an internal combustion engine.

Carbon formation due to high operating temperatures is one of the most prominent causes for malfunction of piston rings particularly in heavy duty internal combustion engines. This is especially true in oil control rings where the ventilation passages in both the ring itself and in the piston may become filled with carbon and stop off oil drainage. If a spring is used with the oil ring, carbon may form beneath it or within it, thereby rendering it ineffective and, if the spring is directly adjacent to the oil drainage passages in the oil control ring, it will block off oil drainage when it becomes clogged. The primary causes for carbon formation are stagnant oil accumulations and heat, either due to high engine operating temperature or hot blow-by gases. The high temperature acts on the stagnant oil to decompose it and a deposit results.

It is an object of the present invention to provide an improved oil control ring which provides effective oil control under severe operating conditions without becoming clogged by carbon formation.

Another object is to provide a one-piece oil ring construction which facilitates fabrication and plating of the ring.

A further object is to provide an improved oil ring assembly comprising a one-piece cast iron ring and a spring expander which assembly is easy to install in the oil groove and which will operate under severe conditions without becoming clogged by carbon formation.

In the accompanying drawing:

FIG. 1 is a fragmentary view of a piston equipped with an improved oil ring assembly in accordance with the present invention with a portion of the piston broken away to illustrate the oil ring assembly.

FIG. 2 is a fragmentary bottom plan view of the oil ring assembly of FIG. 1 shown expanded to free diameter prior to assembly on the piston.

FIG. 3 is a greatly enlarged sectional view taken on the line 3—3 of FIG. 1.

FIG. 4 is a fragmentary perspective view of a portion of the oil ring of the invention as seen from outside and slightly below the ring.

FIG. 5 is a fragmentary perspective view similar to that of FIG. 4 illustrating a modified oil ring of the invention.

FIG. 6 is a sectional view similar to that of FIG. 3 illustrating a modified oil ring assembly of the invention.

FIG. 7 is a sectional view taken on the line 7—7 of FIG. 6.

Referring to FIG. 1 there is shown a conventional piston 10 reciprocable in a cylinder 12 of an internal combustion engine. Piston 10 is provided with a conventional oil ring groove 14 having top and bottom walls 16 and 18 respectively and a back wall 20 (FIG. 3). A series of circumferentially spaced oil drainage openings 22 are provided in piston 10 between back wall 20 of oil ring groove 14 and the hollow interior of piston 10.

One form of an improved piston oil control ring assembly 23 of the present invention comprises a one-piece oil ring segment 24 and a circumferentially continuous non-bottoming type coil spring expander 26 for expanding ring 24 radially outward into sealing contact with the wall of cylinder 12. Spring 26 is spaced from and does not bottom on the back wall 20 of groove 14. Oil ring 24 is preferably constructed of cast iron and has two spaced oil scraping lands 28 and 30 (FIG. 3) which extend radially outwardly from the outer circumferential surface 31 of the ring so as to form a channel defining a circumferential groove 32. The upper land 28 is located adjacent the top surface 40 of ring 24 and the lower land 30 is located therebelow approximately two-thirds of the way down between the top and bottom surfaces 40 and 38 of the ring. The outer tapered peripheral surfaces of lands 28, 30 are preferably plated with a coating 33 of chromium. The lower portion of the ring consists of circumferentially spaced pads 34 (FIGS. 2 and 4) and the spaces therebetween form oil drainage passages 36. Thus the bottom surface 38 of ring 24 is circumferentially discontinuous while the top surface 40 of ring 24 is flat and continuous. This structure thus provides a circumferentially uninterrupted oil collecting space 32′ (FIG. 3) located axially between land 30 and the groove wall 18 and radially outwardly of pads 34 and passages 36.

The inner circumferential surface 42 of ring 24 is provided with an annular spring receiving groove 44 which is semi-circular in cross section (FIG. 3) and of slightly larger radius than that of coil spring 26. Groove 44 is located in the upper portion of the ring above the oil drainage passages 36 with the center line of groove 44 substantially aligned with the center line of the outer circumferential groove 32, i.e., midway between lands 28 and 30. While an oil ring 24 of the present invention may be used without an expander spring, it is preferred to employ an expander spring. The coil spring 26 is preferred since it is simple and provides maximum contact area with the spring receiving groove 44 to insure uniform distribution of spring pressure. Spring 26 is circumferentially compressed in groove 44. The abutting ends 46, 47 of spring 26 (FIG. 2) are aligned by a wire 48 which extends a short distance into each of these abutting ends of the spring.

In operation, piston ring 24 gradually rotates circumferentially in oil groove 14 during reciprocation of piston 10 in cylinder 12. This relative movement between the ring and the oil groove produces a self-cleaning action in the oil ventilation passages 36. It will be noted (FIG. 4) that the opposed side walls 52 and 54 of each two adjacent pads 34 and the intervening undersurface 56 of ring 24 comprise the sides and top of each oil passage 36 while the bottom side of each oil passage is formed by the bottom wall 18 of oil groove 14. Hence the bottom surface 18 of each passage 36 is constantly changing due to this gradual rotation of the ring in the groove 14, thus preventing the formation of carbon deposits in each oil passage 36. Moreover, the difference in materials of ring 24 and piston 10 (normally cast iron and aluminum alloy respectively) as well as the differences in temperature of the ring and piston also resist the formation of lacquer and carbon.

It is also to be noted that side walls 52 and 54 of each pad 34 are each disposed at an acute angle to the direction of rotation of the ring relative to the piston which assists in shearing carbon deposits from groove bottom wall 18. For purposes of description and not by way of limitation the opposed side walls 52 and 54 on adjacent pads 34 are shown in FIG. 4 as converging radially inwardly of the ring. As shown in the modified ring of FIG. 5, the shearing action may also be obtained with pads 35 having opposed side walls 53 and 55 which converge radially outwardly of the ring. Parallel side walls would also provide some beneficial shearing action, but for ease of manufacture the configuration of FIG. 4 is preferred.

Another feature that promotes ring cleanliness and resists clogging is the location of oil drainage passages 36 on the lower side of ring 24 below the lower land 30. As the ring moves down the cylinder wall, the lower land 30 shears the heavy oil film which collects on the cylinder wall and deflects the excess oil through the ring oil passages 36, as indicated by the small arrows in FIG. 3. This sheared oil is thus forced at relatively high velocity and in relatively large quantity through the ring passages 36 so that a continuous flushing action is obtained therein and a new supply of relatively cool oil is kept flowing through the ring, thereby contributing to ring cleanliness.

A further feature which promotes ring cleanliness and effective oil control action of ring-expander assembly 23 is the location of coil spring expander 26. Spring 26 is placed in groove 44 in the upper portion of ring 24 above the oil drainage passages 36 so that it does not interfere with passage of oil through the ring, and so that it is not directly exposed to the oil stream and hence does not itself become clogged with carbon deposits. In addition, coil spring expander 26 is easy to install and retain in the ring and is self centering in the spring receiving groove 44 so that it exerts approximately equal radial pressure on each of the ring lands 28, 30.

The oil ring assembly may be modified in accordance with the present invention as shown in FIGS. 6 and 7 by combining an oil ring 60 with a ribbon type expander 62. Oil ring 60 is identical to oil ring 24 except that the inner circumferential surface 64 disposed above oil passages 36 of ring 60 is flat rather than being grooved. Ribbon expander 62 consists of a split band of flexible spring steel which is radially corrugated (FIG. 7) so as to have alternating inwardly and outwardly bowed arcuate portions 66 and 68 respectively, the latter portions slidably contacting only surface 64 of ring 60 so as to urge the ring radially outwardly into contact with the cylinder wall. The lower edge 69 of expander 62 has a series of narrow legs 70 extending vertically downward integrally therefrom which support the expander on bottom wall 18 of piston groove 14. It is to be noted that legs 70 are located between arcuate portions 66 and 68 so as to be held out of contact with ring 60. Also, the location of lower edge 69 above oil passages 36 and the provision of large venting spaces between adjacent legs 70 permits substantially unobstructed passage of oil from ring passages 36 to piston vents 22.

One common feature of the above described ring assemblies of the present invention resides in the provision of the circumferentially continuous expander contacting surfaces comprising groove 44 of ring 24 or flat surface 64 of ring 60. This is in contrast to some known cast iron oil rings wherein the oil drainage passages open into the spring contacting surface of the ring so that the ring furnishes only circumferentially discontinuous support for the expander spring. Thus rings 24 and 60 eliminate the problem of frictional wear caused by the expander spring rubbing against the edges of the oil passage openings of such known rings.

A still further feature of oil ring 24 of the present invention is the location of lands 28, 30 above the oil passages 36 which thus provides two circumferentially continuous sealing surfaces or baffles which prevent most of the hot combustion blow-by gases from reaching the oil passages 36. Also, these two lands 28, 30 provide a double baffle above the oil passages 36 to prevent the upward passage of oil to the combustion chamber of the cylinder.

Since the bottom 31 and the side walls of lands 28 and 30 defining groove 32 are imperforate and since lands 28 and 30 act as seals, oil laden crankcase gases are not constantly being admitted to the groove 32. Because of this structure, practically no oil or crankcase gases circulate into and out of groove 32. Any oil which does accumulate in groove 32 is thus not subjected to the harmful effects of such gases and the supply of oil in this channel can accumulate or change only at a very slow rate. Once the carbon forming deposit content of the relatively constant body of oil in groove 32 has deposited there is very little additional deposit accumulation resulting from the admission of fresh oil. Hence the feature of a non-ventilated groove 32 between the pair of continuous scraping lands 28, 30 helps to keep groove 32 exceptionally clean.

The above described piston ring 24 is also economical to manufacture. If it is desired to chrome plate this ring in the manner shown in FIG. 3, this is relatively easy to accomplish inasmuch as the channel configuration formed by scraping lands 28, 30 is of uniform cross-section all way around the ring and there are no ventilation slots to consider in the area of groove 32. Also, since there are no oil passages entering between scraping lands 28 and 30 the problem of "gassing" during electroplating is substantially reduced: that is, there are no oil venting passages communicating between groove 32 and the inner circumference of ring 24 to permit the gas bubbles generated during the plating operation to enter between the scraping lands 28, 30. In one piece rings having such oil passages between the lands the gas bubbles admitted through these passages pass over the lands, often causing the land plating to become pitted.

The location of oil passages 36 of ring 24 of the present invention also facilitates the machining of these passages in the ring. Oil passages 36 are preferably formed after the chrome plating operation by first grinding off the chrome plating, and then milling through the cast iron material disposed between scraping land 30 and the bottom surface 38 of the ring with a milling cutter of suitable radius. The milling cutter automatically produces the angled side walls 52, 54 of pads 34 of FIGS. 2 and 4 when the cutter is operated from outside the ring and moved radially inward thereof in making the cut. Both the grinding and milling operations are performed with rings 24 arranged in a series of "back-to-back" pairs with one section of the grinding wheel or one cutter acting simultaneously on two rings. Obviously this reduces the number of tools and/or the time required to machine the oil passage slots 36. In addition, production is facilitated since the permissible tolerances are greater in the area below the lower scraping lands 30 than would be the case if oil passages had to be milled between the scraping lands 28 and 30.

I claim:

An oil ring assembly for use in the oil groove of an internal combustion engine piston comprising a one-piece annular parted ring having top and bottom surfaces respectively adapted to face the combustion chamber and crankcase ends of the piston, said ring having only two cylinder wall engaging portions consisting of a pair of axially spaced cylinder scraping lands extending radially outwardly from the ring and being circumferentially continuous except at the ring parting, said ring being imperforate between the radial planes of said lands whereby said lands and the outer periphery of the ring therebetween define an unventilated circumferentially extending oil collecting groove in the ring, the one of said lands closest to said ring bottom surface being spaced axially therefrom to define with the outer periphery of said ring below said one land a circumferentially uninterrupted oil collecting space, said ring having a series of circumferentially spaced radially extending slots in said bottom surface thereof for draining oil radially inwardly from said oil collecting space to the area of the piston oil groove behind the ring, said ring having a circumferentially continuous groove in its inner peripheral surface located substantially between the radial planes of said scraping lands and above said oil drainage slots, and an annular coil spring expander engaging said ring solely in said last-mentioned groove to thereby exert radial expanding forces on said ring in substantially balanced relation with said lands.

References Cited by the Examiner
UNITED STATES PATENTS

| | | | |
|---|---|---|---|
| 1,782,426 | 11/30 | Johnson | 277—78 |
| 2,124,094 | 7/38 | Wenzel | 277—201 |
| 2,372,979 | 4/45 | Phillips | 277—214 |
| 2,668,088 | 2/54 | Hsia-Si Pien | 277—75 |
| 3,066,943 | 12/62 | Brenneke | 277—143 XR |

References Cited by the Applicant
UNITED STATES PATENTS

| | | |
|---|---|---|
| 1,999,494 | 4/35 | Zahodiakin. |
| 2,080,898 | 5/37 | Phillips. |

LEWIS J. LENNY, *Primary Examiner.*

SAMUEL ROTHBERG, EDWARD V. BENHAM,
*Examiners.*